(12) United States Patent
Klaussner et al.

(10) Patent No.: US 10,862,362 B2
(45) Date of Patent: Dec. 8, 2020

(54) CORONA SHIELDING SYSTEM AND ELECTRICAL MACHINE

(71) Applicant: Siemens Aktiengesellschaft, Munich (DE)

(72) Inventors: Bernhard Klaussner, Nuremberg (DE); Jiri Lang, Nuremberg (DE); Steffen Lang, Hallerndorf (DE); Alexander Litinsky, Duesseldorf (DE); Guido Schmidt, Leichlingen (DE); Christian Schulz-Drost, Nuremburg-Neunhof (DE); Klaus Schaefer, Nuremberg (DE); Christian Staubach, Marl (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 205 days.

(21) Appl. No.: 15/511,306

(22) PCT Filed: Aug. 3, 2015

(86) PCT No.: PCT/EP2015/067791
§ 371 (c)(1),
(2) Date: Mar. 15, 2017

(87) PCT Pub. No.: WO2016/045846
PCT Pub. Date: Mar. 31, 2016

(65) Prior Publication Data
US 2017/0288487 A1 Oct. 5, 2017

(30) Foreign Application Priority Data

Sep. 25, 2014 (DE) .................. 10 2014 219 441

(51) Int. Cl.
*H02K 3/40* (2006.01)
*H01B 3/04* (2006.01)
(Continued)

(52) U.S. Cl.
CPC .............. *H02K 3/40* (2013.01); *H01B 3/002* (2013.01); *H01B 3/04* (2013.01); *H01B 3/10* (2013.01); *H01B 3/12* (2013.01)

(58) Field of Classification Search
CPC ... H02K 3/40; H02K 3/42; H01B 3/04; H01B 3/10; H01B 3/12
(Continued)

(56) References Cited

U.S. PATENT DOCUMENTS 5,300,844 A   4/1994   Schuler .................... 310/215
5,319,276 A   6/1994   Schuler .................... 310/196
(Continued)

FOREIGN PATENT DOCUMENTS

CA   2360321 A   7/2000   ............. H02K 15/10
CN   1080096 A   12/1993   ............. H01K 15/12
(Continued)

OTHER PUBLICATIONS

Machine Translation, Groeppel, EP-2362399-A1, Aug. 2011. (Year: 2011).*

(Continued)

*Primary Examiner* — Thomas Truong
(74) *Attorney, Agent, or Firm* — Slayden Grubert Beard PLLC

(57) ABSTRACT

The present disclosure relates to electrical machines. The teachings thereof may be embodied in a corona shielding system, especially for an electrical machine, e.g., a high-voltage machine, such as a generator for generation of electrical energy, an electric motor, or another piece of electrical equipment having a relatively high rated voltage, e.g., a transformer or a bushing or a cable. A corona shielding system may include: a polymeric matrix; and filler particles comprising mica surrounded by a layer of at least (Continued)

Figure 1:
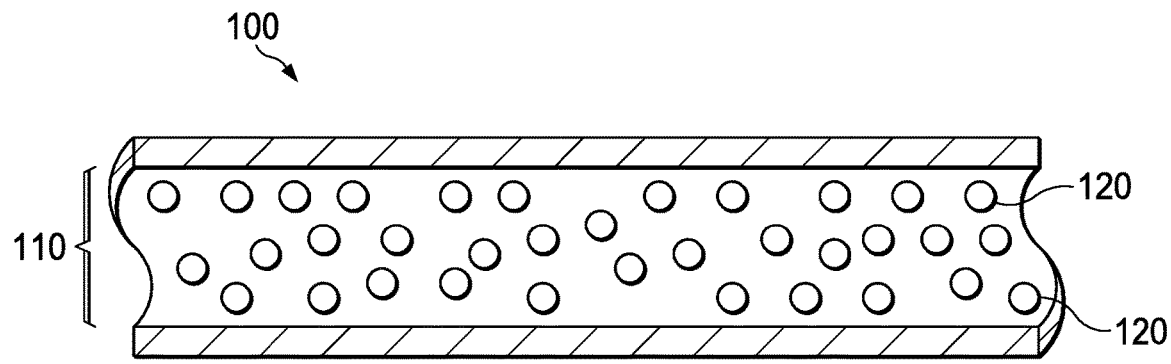

one ceramic metal oxide. The filler particles may be distributed throughout the polymeric matrix.

7 Claims, 1 Drawing Sheet

(51) Int. Cl.
*H01B 3/00* (2006.01)
*H01B 3/10* (2006.01)
*H01B 3/12* (2006.01)

(58) Field of Classification Search
USPC .................................. 310/43, 196, 214, 215
See application file for complete search history.

(56) References Cited

U.S. PATENT DOCUMENTS

| | | | |
|---|---|---|---|
| 5,468,916 A | 11/1995 | Litenas et al. ................ | 174/127 |
| 6,017,627 A | 1/2000 | Iwata et al. ................... | 428/375 |
| 6,075,303 A * | 6/2000 | Schuler .................... | H02K 3/40 |
| | | | 156/53 |
| 6,242,825 B1 * | 6/2001 | Mori ........................ | H02K 3/30 |
| | | | 174/127 |
| 9,396,837 B2 | 7/2016 | Kempen et al. | |
| 9,589,699 B2 | 3/2017 | Gröppel et al. | |
| 2002/0029897 A1 | 3/2002 | Younsi et al. ............ | 174/120 R |
| 2003/0160676 A1 | 8/2003 | Valdemarsson .............. | 336/206 |
| 2007/0114704 A1 | 5/2007 | Stevens et al. .............. | 264/643 |
| 2008/0066942 A1 * | 3/2008 | Miller ..................... | H01B 3/04 |
| | | | 174/36 |
| 2008/0143010 A1 | 6/2008 | Kashikar et al. ............ | 264/112 |
| 2012/0068560 A1 | 3/2012 | Anderton et al. ............ | 310/52 |
| 2013/0244022 A1 | 9/2013 | Rueger et al. .............. | 428/324 |
| 2014/0345907 A1 | 11/2014 | Kempen et al. ............ | 174/127 |

FOREIGN PATENT DOCUMENTS

| | | | | |
|---|---|---|---|---|
| CN | 1338141 A | 2/2002 | ............ | H02K 15/10 |
| CN | 102020850 A | 4/2011 | ............ | C08G 73/10 |
| CN | 103580338 A | 2/2014 | ............ | H02K 3/04 |
| DE | 102009039457 A1 | 3/2011 | ............ | H01B 3/22 |
| DE | 102010009462 A1 | 9/2011 | ............ | H02K 3/40 |
| DE | 102010052889 A1 | 6/2012 | ............ | C09C 1/28 |
| DE | 102011083214 A1 | 3/2013 | ............ | H01B 13/16 |
| DE | 102011083228 A1 | 3/2013 | ............ | H01B 13/08 |
| DE | 102012208226 A1 | 11/2013 | ............ | H01B 13/22 |
| EP | 0049128 A1 | 4/1982 | ............ | H01B 3/04 |
| EP | 0573796 A1 | 12/1993 | ............ | H02K 3/40 |
| EP | 2362399 A1 | 8/2011 | ............ | H01B 3/02 |
| EP | 2362399 A1 * | 8/2011 | ............ | H02K 3/40 |
| EP | 2582018 A1 | 4/2013 | ............ | H02K 3/40 |
| JP | 6122733 A | 1/1986 | ............ | H02K 3/40 |
| JP | 06217484 A | 8/1994 | ............ | H02K 3/34 |
| JP | 10116720 A | 5/1998 | ............ | H01B 17/56 |
| JP | 2005083760 A | 3/2005 | ............ | G04B 19/06 |
| JP | 2014112985 A | 6/2014 | ............ | H02K 3/34 |
| RU | 2088024 C1 | 8/1997 | ............ | H02K 3/40 |
| RU | 2100890 C1 | 12/1997 | ............ | H02K 3/30 |
| RU | 2291542 C2 | 1/2007 | ............ | H02K 15/10 |

OTHER PUBLICATIONS

Japanese Office Action, Application No. 2017516479, 4 pages, dated May 21, 2018.
Chinese Office Action, Application No. 201580051404.6, 6 pages, dated Sep. 18, 2017.
Russian Office Action, Application No. 2017113770/07, 7 pages, dated Dec. 14, 17.
International Search Report and Written Opinion, Application No. PCT/EP2015/067788, 11 pages, dated Nov. 10, 2015.
International Search Report and Written Opinion, Application No. PCT/EP2015/067791, 12 pages, dated Nov. 11, 2015.
International Search Report and Written Opinion, Application No. PCT/EP2015/067785, 12 pages, dated Nov. 25, 2015.
U.S. Non-Final Office Action, U.S. Appl. No. 15/511,344, 33 pages, dated May 1, 2019.
U.S. Non-Final Office Action, U.S. Appl. No. 15/511,326, 33 pages, dated May 1, 2019.
Indian Office Action, Application No. 201717007794, 5 pages, dated Mar. 29, 2019.
Japanese Office Action, Application No. 2017516479, 4 pages, dated Feb. 25, 2019.
Chinese Office Action, Application No. 201580051374.9, 8 pages, dated Mar. 13, 2019.
U.S. Final Office Action, U.S. Appl. No. 15/511,344, 14 pages, dated Aug. 15, 2019.
U.S. Non-Final Office Action, U.S. Appl. No. 15/511,326, 19 pages, dated Mar. 5, 2020.
U.S. Final Office Action, U.S. Appl. No. 15/511,326, 25 pages, dated Nov. 19, 2019.
U.S. Ex Parte Quayle Action, U.S. Appl. No. 15/511,344, 10 pages, Nov. 27, 2019.
U.S. Final Office Action, U.S. Appl. No. 15/511,326, 13 pages, dated Aug. 12, 2020.
European Office Action, Application No. 15747786.0, 5 pages, dated Sep. 24, 2020.

* cited by examiner

CORONA SHIELDING SYSTEM AND ELECTRICAL MACHINE

CROSS-REFERENCE TO RELATED APPLICATIONS

This application is a U.S. National Stage Application of International Application No. PCT/EP2015/067791 filed Aug. 3, 2015, which designates the United States of America, and claims priority to DE Application No. 10 2014 219 441.5 filed Sep. 25, 2014, the contents of which are hereby incorporated by reference in their entirety.

TECHNICAL FIELD

The present disclosure relates to electrical machines. The teachings thereof may be embodied in a corona shielding system, especially for an electrical machine, e.g., a high-voltage machine, such as a generator for generation of electrical energy, an electric motor, or another piece of electrical equipment having a relatively high rated voltage, e.g., a transformer or a bushing or a cable.

BACKGROUND

Machines of ever higher power are being developed, for example generators, as advancing technology requires ever higher power densities. A high-performance generator, for example a turbo generator, may include a stator with a (stator) lamination stack and a multitude of generator grooves with the generator winding present therein. The main insulation of this generator winding against the lamination stack is under high electrical stress. High voltages arise in operation, and must be dissipated in the insulation volume between the conductor bar under high voltage and the lamination stack at ground potential. This increases the field at the edges of the laminations in the lamination stack, and in turn causes partial discharges. These partial discharges, when they meet the insulation system, lead to very significant local heating. This gradually breaks down the organic materials of the insulation system, including this outer corona shield, to volatile products of low molecular weight, for example to carbon dioxide.

An important constituent of the insulation system is what is called an outer corona shield. In larger generators and electric motors, it is applied directly to the surface of the generator winding insulation. At present, the outer corona shield frequently consists of carbon black- and graphite-containing tapes or coating materials. For system-related reasons, in such an insulation system, particularly the interface between the outer corona shield and main insulation cannot be produced in completely pore-free form. Therefore, given sufficiently high electrical field strengths in the insulation system, there is correspondingly high electrical partial discharge activity, which completely burns out the outer corona shield in operation over time. This therefore leads to premature aging of the insulation and in the worst case to a ground fault of the electrical machine. This regularly means irreparable complete failure of the machine.

SUMMARY

The present disclosure may provide a corona shielding system, especially for an electrical machine, e.g., a high-voltage machine, a generator for generation of electrical energy, an electric motor, or another piece of electrical equipment, e.g., a transformer or a bushing or a cable. The corona shielding system may comprise a filler in a polymeric matrix, wherein the filler includes particles which are formed with mica and which have, surrounding the mica, a layer formed by at least one ceramic metal oxide.

In some embodiments, the layer completely surrounds the mica, especially on all sides.

In some embodiments, the layer is formed by aluminum oxide $Al_2O_3$ and/or silicon dioxide $SiO_2$ and/or titanium dioxide $TiO_2$.

Some embodiments include at least one corona shielding paper.

Some embodiments include at least one corona shielding tape.

Some embodiments include at least part of an outer corona shield and/or at least part of an end corona shield.

Some embodiments include an electrical machine, e.g., a high-voltage machine, including a corona shielding system as described above.

DETAILED DESCRIPTION

The teachings of the present disclosure may be employed to provide a stable corona shielding system, and/or an improved electrical machine with a higher life expectancy or useful lifetime. The effectiveness and/or reliability of an outer corona shield may depend on having a certain square resistance within a particular range. If it is too low, the lamination stacks can be electrically short-circuited, which can lead to high induced circulating currents, which occur across the ends of the lamination stack and the outer corona shield and lead to high-current arcs. In the case of excessive resistance, by contrast, there can be high-voltage spark erosion. Ideally, the resistance in the outer corona shield system would be adjustable, such that it would be possible to establish anisotropy, showing elevated conductivity in the radial direction, from the current conductor toward the lamination stack, and elevated resistance, or low conductivity, in bar direction.

Frequently, in corona shielding systems, mica provides resistance to partial discharges. Typically, mica is used in insulation systems in the form of insulation tape based on fine mica paper with carrier materials such as, more particularly, films, woven fabrics, nonwoven fabrics and the necessary resins for bonding of the paper to the carrier materials and for mechanical stabilization of the mica paper ("sealing resin").

A tendency to delamination may be a critical factor for the lifetime of the insulation systems and hence of the electrical machine. Delamination gives rise to defects, which lead to elevated partial discharge activity and to failure of the insulation system and hence of the electrical machine. Mica particles may constitute a mechanical weak point in a corona shielding system, since mica particles are easily divisible. In this way, mica particles constitute a typical cause of delamination of corona shielding systems causing defects which lead to elevated partial discharge activity and to failure of the insulation.

Increased stability of the corona shielding system may be achieved by distinctly lowering the divisibility of the mica particles and hence the delamination of the corona shielding system. A layer formed by a ceramic metal oxide may provide a coating with a stable mechanical bond of the individual mica layers in the particle and hence effectively prevent division at these mica layers caused by the crystal planes. The particles may have dimensions, at least on average (especially an arithmetic mean), of not more than one millimeter and/or, at least on average (especially an arithmetic mean), of not more than one hundred micrometers. In some embodiments, the layer completely surrounds the mica of a particle on all sides.

In some embodiments, the layer is formed by aluminum oxide ($Al_2O_3$) and/or silicon dioxide ($SiO_2$) and/or titanium dioxide ($TiO_2$). The aforementioned ceramic metal oxides are electrically nonconductive and enable suitable mechanical stabilization.

In some embodiments, the corona shielding system is a corona shielding paper. The production of mica paper with mica particles may be employed with mica particles which have the layer formed by at least one ceramic metal oxide. In some embodiments, the corona shielding system includes a carrier material to which the corona shielding paper is bonded. In some embodiments, the carrier material comprises a film and/or a woven fabric and/or a nonwoven fabric.

In some embodiments, the corona shielding system is at least one corona shielding tape. More particularly, the mica paper, as described above, may be admixed with organic fibers, e.g., aramid and/or PET (polyethylene terephthalate). In this way, the mica tape is realized without a carrier.

In some embodiments, the corona shielding system is at least part of an outer corona shield and/or at least part of an end corona shield.

Some embodiments may include an electrical machine, e.g., a high-voltage machine, with a corona shielding system as described above. In some embodiments, the electrical machine comprises a generator for generation of electrical energy, an electric motor, or another piece of electrical equipment having a relatively high rated voltage, e.g., a transformer, or a bushing, or a cable.

FIG.1 shows an example corona shielding system 100 for an electrical machine incorporating the teachings of the present disclosure. The corona shielding system 100 comprises a polymeric matric 110 and filler 120 disposed in the polymeric matrix 110.

Figure 2:
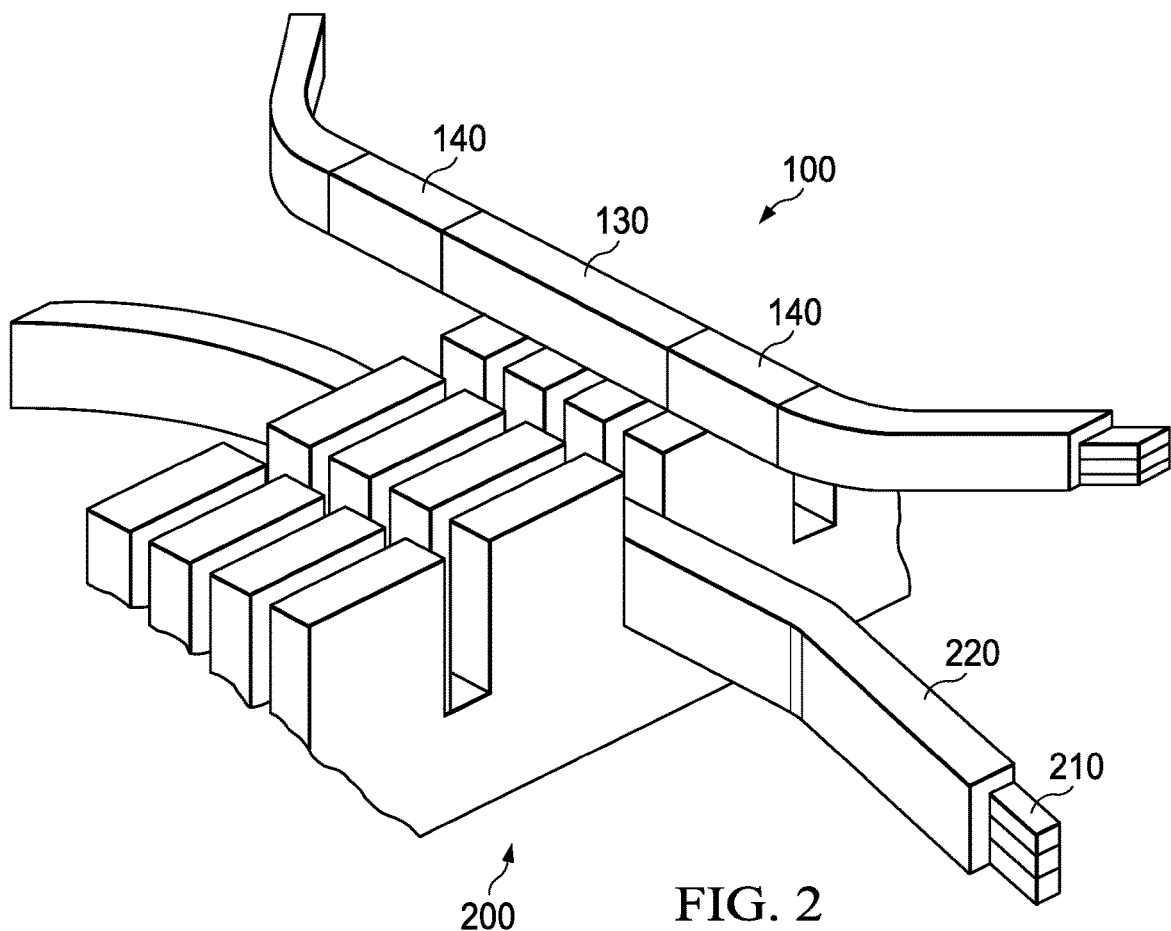

FIG.2 shows a portion of an example electrical machine 200 incorporating the teachings of the present disclosure. The electrical machine 200 comprises a high-voltage machine with a set of windings 210 having an electrical insulator 220 and a corona shielding system 100. The corona shielding system 100 comprises a polymeric matrix 110 and a filler 120 disposed in the polymeric matrix 110. Further, the corona shielding system 100 includes an outer corona shield 130 for wrapping the area of each winding 210 within the core of the electrical machine 200 and an end corona shield 140 for wrapping the area of each winding 210 outside the core.

What is claimed is:

1. A corona shielding system comprising:
   a polymeric matrix; and
   filler particles, each particle comprising a core of individual mica layers surrounded by a layer including a ceramic metal oxide;
   the filler particles distributed throughout the polymeric matrix.

2. The corona shielding system as claimed in claim 1, wherein the layer completely surrounds the core.

3. The corona shielding system as claimed in claim 1, wherein the ceramic metal oxide comprises at least one material selected from the group consisting of: aluminum oxide Al2O3, silicon dioxide SiO2, and titanium dioxide TiO2.

4. The corona shielding system as claimed in claim 1, further comprising:
   a carrier material; and
   at least one corona shielding paper bonded to the carrier material, wherein the at least one corona shielding paper includes the filler particles distributed throughout the polymeric matrix.

5. The corona shielding system as claimed in claim 1, further comprising at least one corona shielding tape including an admixture of the filler particles and organic fibers.

6. The corona shielding system as claimed in claim 1, wherein the system is deployed as at least part of an outer corona shield or at least part of an end corona shield.

7. An electrical machine comprising:
   a conductor bar under high voltage;
   a lamination stack at ground potential; and
   a corona shielding system separating the conductor bar and the lamination stack, the corona shielding system comprising:
   a polymeric matrix;
   filler particles, each particle comprising a core of individual mica layers surrounded by a layer including a ceramic metal oxide;
   the filler particles distributed throughout the polymeric matrix.

* * * * *